US006878922B1

(12) United States Patent
Bohn

(10) Patent No.: US 6,878,922 B1
(45) Date of Patent: Apr. 12, 2005

(54) OPTICAL SYSTEM FOR COMPENSATING FOR NON-UNIFORM ILLUMINATION OF AN OBJECT

(75) Inventor: David D. Bohn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 09/220,736

(22) Filed: Dec. 23, 1998

(51) Int. Cl.$^7$ ................................................ H01J 3/14
(52) U.S. Cl. .................................... 250/216; 348/473
(58) Field of Search ................................ 250/208.1, 216, 250/237 R, 234, 235, 204, 559.12; 358/482, 483, 484, 471, 472, 473

(56) References Cited

U.S. PATENT DOCUMENTS

| | | | |
|---|---|---|---|
| 3,214,596 A | * 10/1965 | Schwerdt et al | 250/239 |
| 3,825,747 A | * 7/1974 | Thomson | 250/216 |
| 3,918,028 A | 11/1975 | Humphrey et al. | 340/146.3 |
| 4,233,501 A | * 11/1980 | Strother | 250/229 |
| 4,380,390 A | 4/1983 | Tateoka et al. | |
| 4,523,235 A | 6/1985 | Rajchman | 358/256 |
| 4,839,514 A | 6/1989 | Mine et al. | |
| 4,868,676 A | 9/1989 | Matsuura et al. | 358/296 |
| 4,926,041 A | 5/1990 | Boyd | 250/226 |
| 4,959,541 A | 9/1990 | Boyd | 250/237 R |
| 5,022,725 A | * 6/1991 | Matsunami et al. | 350/14 |
| 5,038,028 A | 8/1991 | Boyd et al. | 250/208.1 |
| 5,089,712 A | 2/1992 | Holland | 250/557 |
| 5,306,908 A | 4/1994 | McConica et al. | 250/234 |
| 5,381,020 A | 1/1995 | Kochis et al. | 250/566 |
| 5,523,562 A | 6/1996 | Maple | 250/235 |
| 5,552,597 A | 9/1996 | McConica | 250/234 |
| 5,578,813 A | 11/1996 | Allen et al. | 250/208.1 |
| 5,586,212 A | 12/1996 | McConica et al. | 385/146 |
| 5,646,402 A | 7/1997 | Khovaylo et al. | 250/234 |
| 5,751,840 A | 5/1998 | Raterman et al. | 382/135 |
| 5,812,172 A | 9/1998 | Yamada | 347/171 |

FOREIGN PATENT DOCUMENTS

EP 0411800 A3 2/1991

OTHER PUBLICATIONS

European Patent Office Search Report dated Mar. 26, 2003, issued in corresponding EP application 99117647.0 to Hewlett–Packard Co.

* cited by examiner

Primary Examiner—Thanh X. Luu

(57) ABSTRACT

An optical system for forming an image of at least a portion of an illuminated area on an object may comprise a lens positioned a spaced distance from the illuminated area on the object and an aperture stop positioned so that it is substantially co-planar with the image side focal plane of the lens. An occluding element is positioned between the lens and the illuminated area on the object so that the occluding element blocks a predetermined amount of light from a brightly illuminated region in the illuminated area but does not substantially block light from a less brightly illuminated region in the illuminated area.

17 Claims, 7 Drawing Sheets

OPTICAL SYSTEM FOR COMPENSATING FOR NON-UNIFORM ILLUMINATION OF AN OBJECT

FIELD OF INVENTION

This invention relates to imaging devices in general and more specifically to hand-held or portable optical scanners having optical position sensing systems.

BACKGROUND

Optical scanner devices are well-known in the art and may be used to produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation is complete via any convenient means, such as a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a plurality of light emitting diodes (LEDs), although other types of light sources, such as fluorescent or incandescent lamps, may also be used. The optical system may include a "contact image sensor" or CIS to focus the image of the illuminated scan line onto the surface of the detector. Alternatively, a lens and/or mirror assembly may be used to collect and focus light from the illuminated scan region onto the detector.

The photosensitive detector used to detect the image light focused thereon by the optical system typically comprises a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots of an image focused thereon.

The term "image light" as used herein refers to the light that is focused onto the surface of the detector array by the optical system. Depending on the type of scanner and the type of document, the image light may be reflected from the object being scanned or it may be transmitted through the object. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

The hand-held scanner device may be provided with a position sensing or "navigation" system in order to determine the position of the hand-held scanner with respect to the object being scanned. Accordingly, such a position sensing system allows the scanner to correlate its position with respect to the object being scanned. The position correlation allows a complete image of the scanned object to be produced even though the scanner may not scan the entire object during a single pass or "swipe." For example, if two or more swipes of the object are required to scan the entire object, then the position correlation provided by the navigation system will allow the various portions of the scanned image data to be "stitched" together to form a single unitary image representative of the entire scanned object.

One type of navigation system utilizes a pair of optical sensors to detect certain inherent structural features (e.g., surface roughness, paper fiber orientation, etc.) contained on the object being scanned (e.g., a sheet of paper with text or images thereon). Examples of the foregoing type of navigation system are disclosed in U.S. Pat. No. 5,089,712 of Holland for "Sheet Advancement Control System Detecting Fiber Pattern of Sheet," and U.S. Pat. No. 5,578,813 of Allen, et al., for "Freehand Image Scanning Device which Compensates for Non-Linear Movement," both of which are specifically incorporated herein by reference for all that they disclose.

While such navigation systems are known and are being used, they are not without their problems. For example, one problem associated with optical navigation systems of the type described above stems from the difficulty in uniformly illuminating the inherent structural features on the object so that the same may be detected by the navigation sensors. The light sources typically used to illuminate the navigation areas (e.g., infra-red light emitting diodes (LEDs)) typically do not provide a uniform illumination pattern. Consequently, the illuminated navigation area may comprise one or more brightly illuminated regions and one or more less-brightly illuminated regions. If the difference between the brightly illuminated regions and the less brightly illuminated regions is substantial, there is a significant chance that the navigation system will interpret the non-uniformity of illumination as fixed pattern noise, which may result in the navigation system producing a false navigation signal. Such false navigation signals may well result in erroneous position values which may make it impossible for the image data processing system to successfully stitch together the various image portions captured during the various scanning swipes.

One solution to the non-uniform illumination problem described above is to provide the light source with one or more lenses or reflectors to better distribute and focus the light onto the navigation area. Unfortunately, such lens or reflector systems may be difficult to fabricate and align and, in any event, tend to add considerably to the overall cost of the scanner. Partly in an effort to avoid the foregoing problems, most optical navigation systems utilize LEDs having integral lenses of the type that are well-known and readily commercially available. While the integral lens design avoids the problems associated with providing separate lenses or reflectors, the quality of most such integral lens arrangements is generally quite poor, and it is not uncommon for the illumination patterns produced by such integral lens LEDs to contain substantial non-uniformities. Indeed, the quality of the illumination provided by such integral lens LEDs is generally barely sufficient to allow for the consistent and reliable operation of the scanner navigation system.

SUMMARY OF THE INVENTION

An optical system for forming an image of at least a portion of an illuminated area on an object may comprise a lens positioned a spaced distance from the illuminated area on the object and an aperture stop positioned so that it is substantially co-planar with the image side focal plane of the lens. An occluding element is positioned between the lens and the illuminated area on the object so that the occluding element blocks a predetermined amount of light from a brightly illuminated region in the illuminated area but does not substantially block light from a less brightly illuminated region in the illuminated area.

Also disclosed is a method for forming an image of at least a portion of an illuminated area on an object that comprises the steps of: Positioning a lens a spaced distance from the illuminated area on the object; positioning an aperture stop at about the image side focal plane of the lens; and blocking a predetermined amount of light from a brightly illuminated region in the illuminated area before the light from the brightly illuminated region is refracted by the lens.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
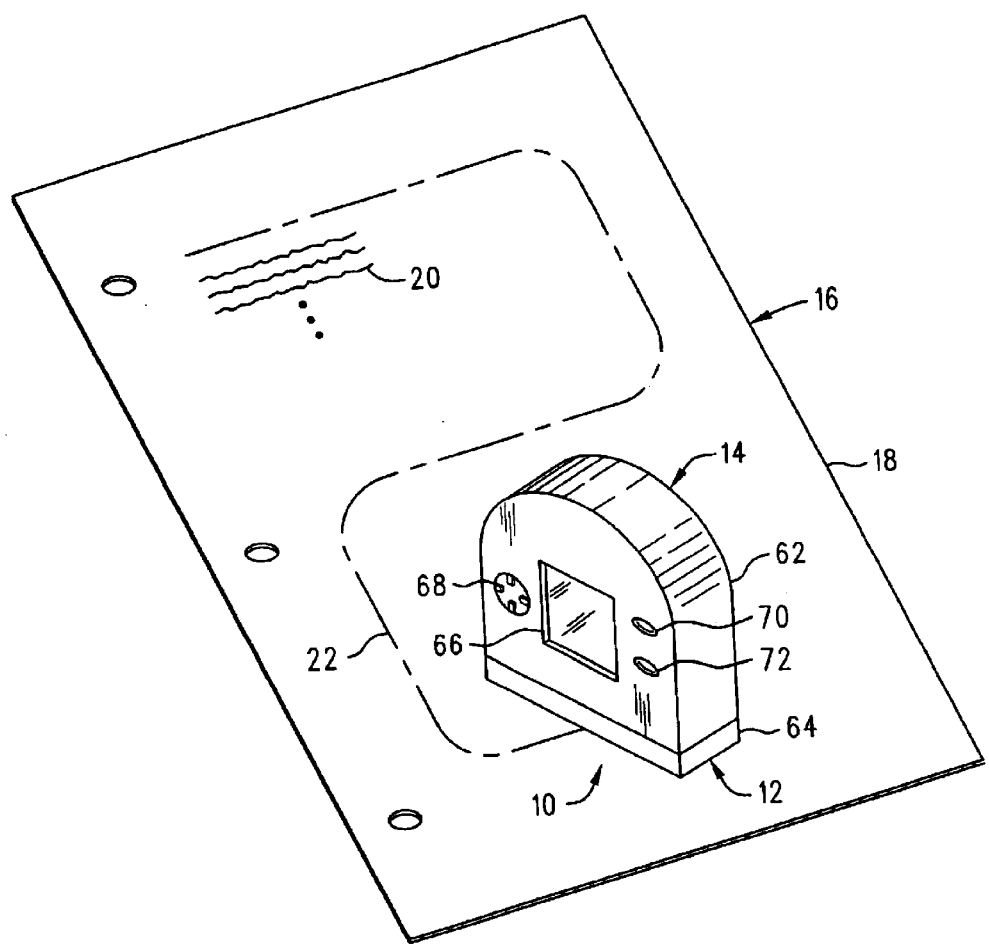
FIG. 1 is a perspective view of a portable image scanner having a navigation system that utilizes the optical system for compensating for non-uniform illumination according to the present invention.

An optical system 10 (FIG. 7) for compensating for non-uniform illumination of an object is shown and described herein as it could be used in an optical navigation system 12 of the type that may be used in a portable or hand-held image scanner 14 (FIG. 1). As will be described in greater detail below, the optical system 10 compensates for the non-uniform illumination of the object from which navigation data are obtained, thereby enhancing the consistency and reliability of the navigation data produced by the optical navigation system 12.

In the exemplary application illustrated in FIG. 1, the portable or hand-held image scanner 14 may be used to scan an object 16, such as a document 18 with written text 20 provided thereon. The optical navigation system 12 provides position or navigation information to the scanner 14 thereby allowing the scanner 14 to scan documents of nearly any size regardless of the size of the portable image scanner 14. For example, the entire document 18 may be scanned by moving the portable image scanner 14 over the document 18 along a meandering or curvilinear scanning path 22 which defines one or more scanning passes or "swipes." The position or navigation information provided by the navigation system 12 may then be used to piece or "stitch" together the various image data pieces acquired during each swipe to form image data representative of the entirety of the scanned document 18.

Figure 3:
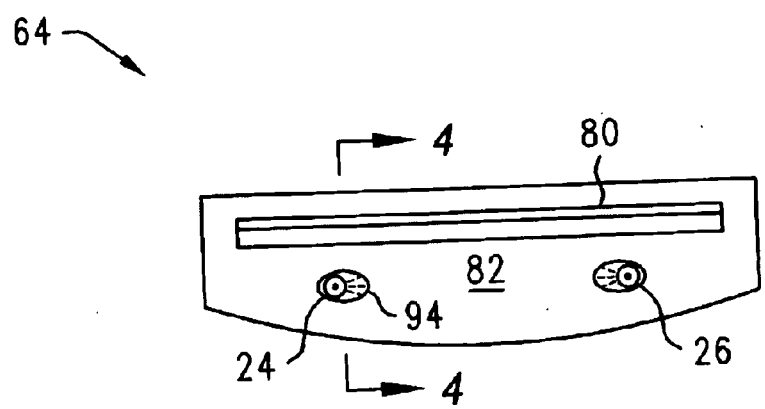
FIG. 3 is a plan view of the contact surface of the image head of the portable image scanner showing the position of the two navigation sensor openings.
Figure 4:
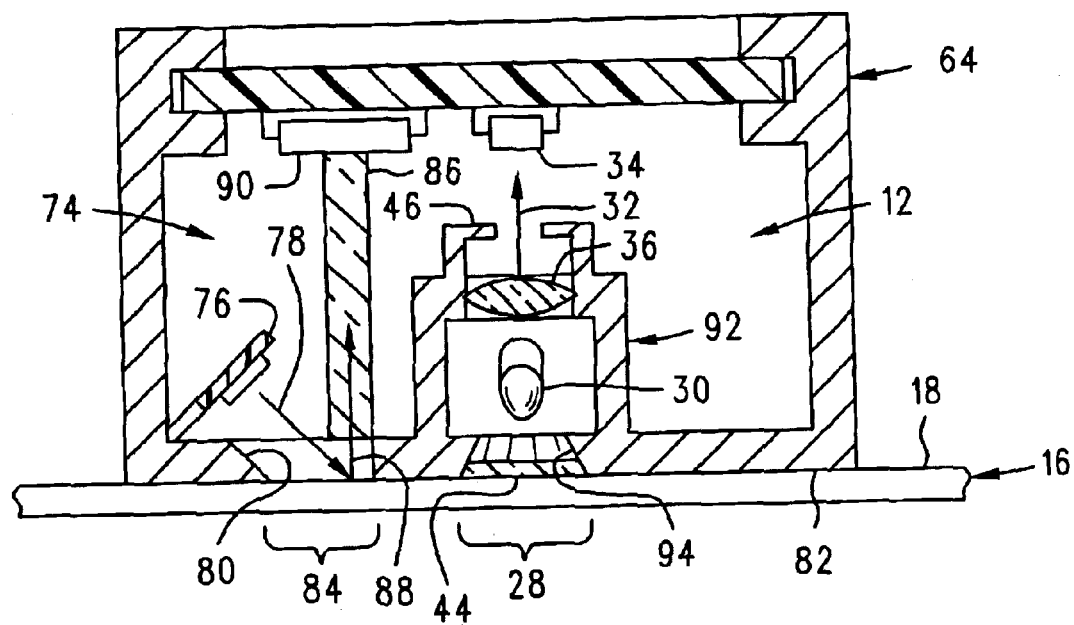
FIG. 4 is a cross-section view in elevation of the image head of the portable image scanner taken along the line 4—4 of FIG. 3.
Figure 7:
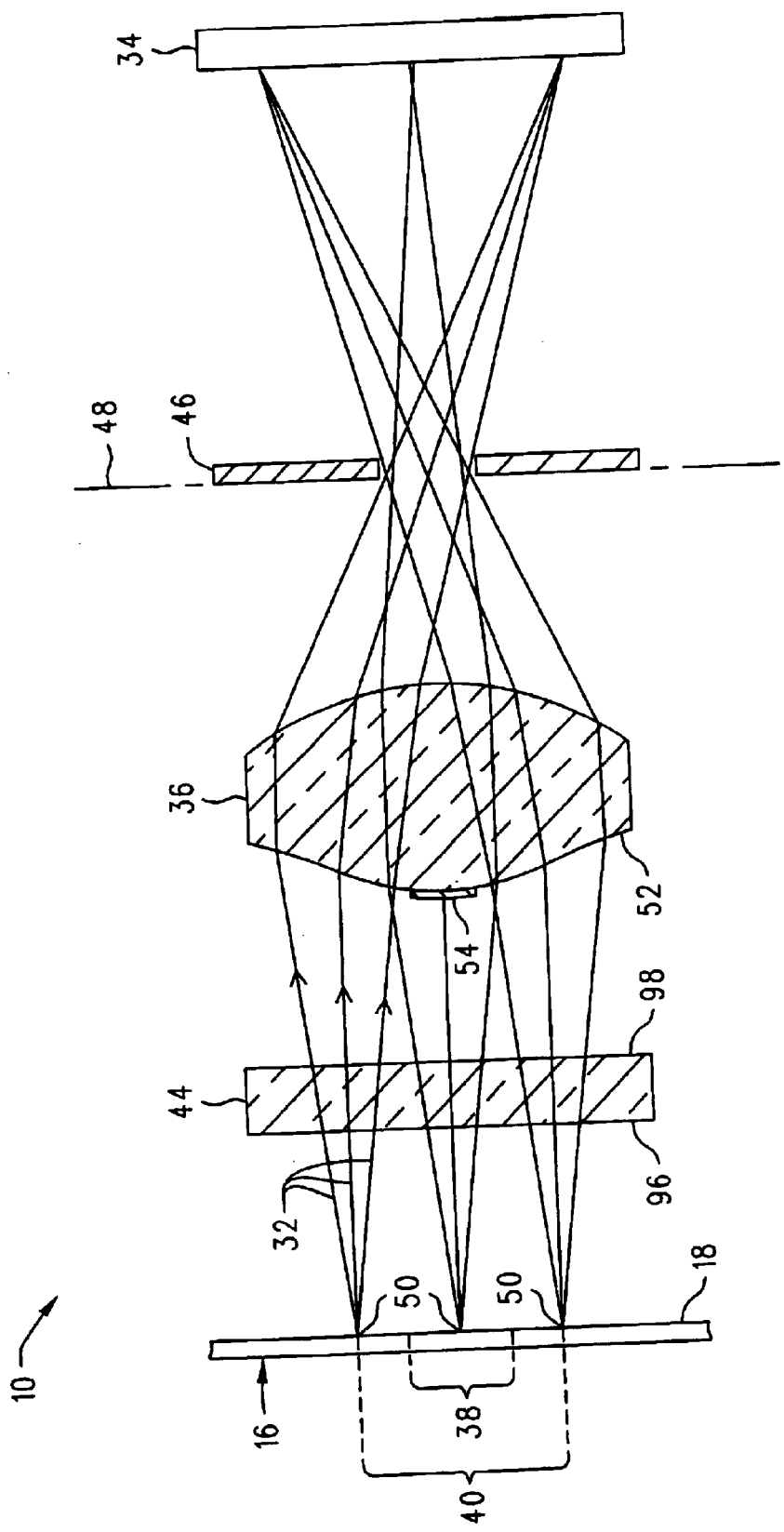
FIG. 7 is a schematic representation of the optical system for compensating for non-uniform illumination.

Referring now to FIGS. 3 and 4, the navigation system 12 may include first and second navigation sensor assemblies 24 and 26, each of which "views" a corresponding navigation area (e.g., navigation area 28) on the object 16 being scanned. In one preferred embodiment, the navigation sensor assemblies 24 and 26 are essentially identical, so only the first navigation sensor assembly 24 will be described herein. The first navigation sensor assembly 24 includes a light source 30, the optical system 10, and a navigation detector 34. The light source 30 illuminates a navigation area 28 on the object 16. Navigation light 32 reflected by the illuminated navigation area 28 is focused onto the surface of the navigation detector 34 by the optical system 10 (FIG. 7). The detector 34 produces an output signal (not shown) that corresponds to the navigation light 32 reflected by the illuminated navigation area 28. The output signal from the detector 34 may be processed by a navigation data processing system (not shown) to produce a navigation data signal (also not shown) that is indicative of the position of the portable image scanner 14 with respect to the object 16 being scanned.

Figure 5:
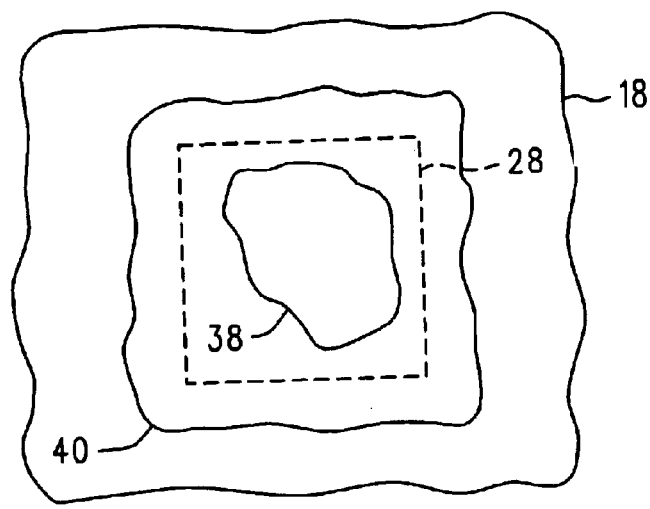
FIG. 5 is a schematic representation of an illuminated navigation area showing the brightly illuminated region and the less-brightly illuminated region.

With reference now primarily to FIG. 5, the illumination provided to the navigation area 28 by the light source 30 is generally non-uniform and may comprise a plurality of regions having varying brightness levels. For example, the illuminated navigation area 28 may be characterized by a brightly illuminated region 38 located at about the center of the navigation area 28 and a less brightly illuminated region 40 located generally at the periphery of the navigation area 28. As an aside, it should be noted that in practice, the illuminated navigation area 28 normally will be characterized as having a large number of differently illuminated regions that may or may not be located at the positions shown in FIG. 5. However, for ease of discussion and illustration, the illuminated navigation area 28 is shown and described herein as having only two regions 38 and 40 of differing brightness and located at about the positions illustrated in FIG. 5. That is, the brightly illuminated region 38 may be located at about the center region of the illuminated navigation area 28, whereas the less brightly illuminated region 40 may be located at about the outer regions or periphery of the navigation area 28.

Figure 6:
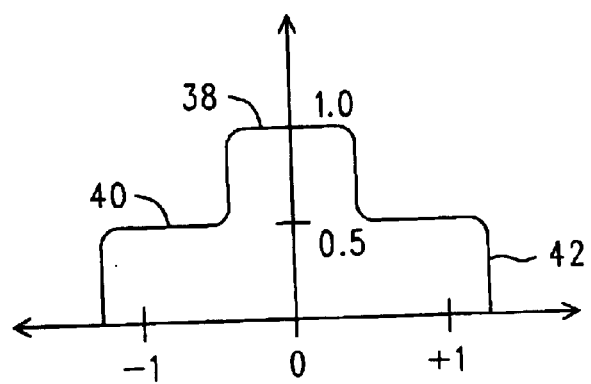
FIG. 6 is a graphical representation of the normalized illumination function of the illuminated navigation area shown in FIG. 5.

The illumination provided to the navigation area 28 and schematically illustrated in FIG. 5 may be graphically represented by an illumination function 42, as shown in FIG. 6. For ease of illustration, the illumination function 42 shown in FIG. 6 is normalized so that the brightly illuminated region 38 is defined as having a brightness of unity. Accordingly, the less brightly illuminated region 40 will have a brightness level that is less than one. For example, in the hypothetical illumination function 42 shown and described herein, the less brightly illuminated region 40 has a brightness of 0.5 (i.e., half the brightness of the brightly illuminated region 38). Again, it should be remembered that the foregoing number of differently illuminated regions (i.e., two) and the brightness ratios thereof (i.e., 2:1) are illustrative only and may or may not be representative of the actual number of differently illuminated regions and corresponding brightness ratios associated with a particular illumination system.

The optical system 10 utilized in the navigation system 12 is best seen in FIG. 7 and may comprise a lens assembly 36 positioned so that it is located between the object 16 and the navigation detector 34. The optical system 10 may be provided with an optional transparent window 44 positioned between the lens assembly 36 and the object 16 to shield the lens assembly 36 from dirt and protect it from damage. An aperture 46 may be positioned between the lens 36 and the navigation detector 34 so that it is substantially co-planar with an image side focal plane 48 associated with lens assembly 36. The location of the aperture 46 at about the image side focal plane 48 of lens 36 makes the lens assembly 36 telecentric. Accordingly, the aperture 46 may be referred to herein in the alternative as a "telecentric aperture." As a result of the telecentric lens configuration, the cones of light 32 reflected by various illuminated field points 50 contained within the illuminated navigation area 28 on the object 16 remain relatively well-separated in the region between the object 16 and the front or object side surface 52 of lens assembly 36. See FIG. 7.

Figure 8:
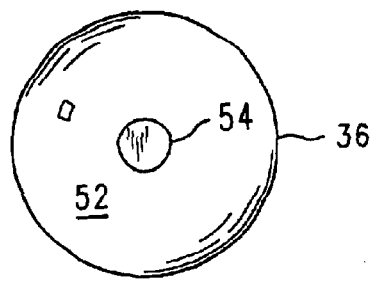
FIG. 8 is a plan view of the lens showing the relative position of the occluding element thereon.
Figure 9:
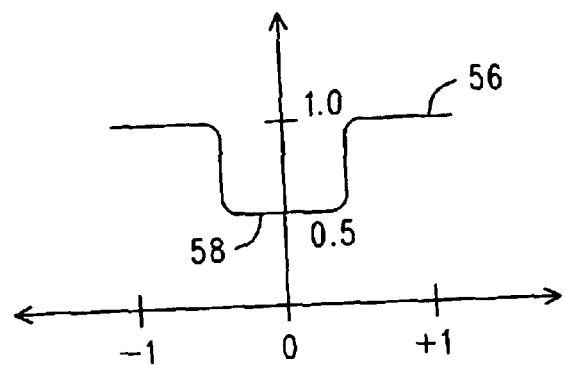
FIG. 9 is a graphical representation of the normalized transmittance function of the optical system.

The optical assembly 10 may also be provided with an occluding element 54 positioned between the object 16 and the lens 36 so that the occluding element 54 blocks a predetermined amount of light from the brightly illuminated region 38, but does not substantially block light from the less brightly illuminated region 40. In one preferred embodiment, the occluding element 54 may comprise a substantially circular opaque material, such as black paint, deposited on the center region of the object side surface 52 of lens 36, as best seen in FIG. 8. Alternatively, other configurations are possible, as will be described in greater detail below.

Figure 10:
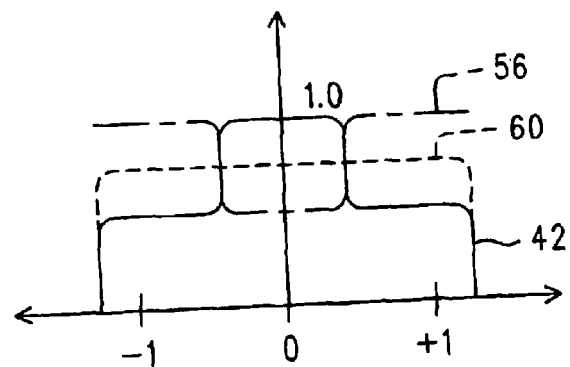
FIG. 10 is a graphical superposition of the illumination and transmittance functions illustrated in FIGS. 6 and 9, respectively, and the resulting compensated illumination function.

The combination of the telecentric lens assembly 36 and the occluding element 54 results in a transmittance function 56 for the optical system 10 that contains a low transmittance "bucket" 58 for field points 50 located in the center region of the illuminated navigation area 28. That is, if the optical system 10 is used to form an image of an illuminated object, the low transmittance bucket 58 of the transmittance function 56 will result in an image having a center region with a reduced brightness level. Accordingly, if the optical system 10 is used to form an image of the illuminated navigation area 28 having an illumination function 42 substantially as shown in FIG. 6 (i.e., an illuminated area having a brightly illuminated center region 38 and a less brightly illuminated periphery 40), the result will be an image that will appear as if it were more uniformly illuminated than is actually the case. The optical system 10 compensates for the non-uniform illumination of the object by having a high transmittance for areas that correspond to the less brightly illuminated region 40 (FIG. 5) and a reduced transmittance 58 for areas that correspond to the brightly illuminated region 38. Expressed graphically, the combination of the transmittance function 56 and the illumination function 42 results in a compensated illumination function 60, as best seen in FIG. 10.

The shape of the transmittance function 56 may be controlled by varying the size, shape, and location of the occluding element 54 so that the combination of the transmittance and illumination functions 56 and 42 results in a compensated illumination function 60 having the desired characteristic or response. For example, in the embodiment shown and described herein, it is desirable to adjust the transmittance function 56 so that the resulting compensated illumination function 60 forms a substantially straight line, as best seen in FIG. 10. Such a straight-line illumination function 60 means that the image formed by the optical system 10 will appear as if it were substantially uniformly illuminated.

A significant advantage associated with the optical system 10 according to the present invention is that it may be used to compensate for the non-uniform illumination of an object, thereby allowing the image of the object to appear as if the object were more uniformly illuminated. The illumination compensation provided by the optical system thereby dispenses with the need to provide a high quality or high precision light source to more uniformly illuminate the object. Accordingly, in the application shown and described herein, the optical system 10 dispenses with the need to provide the navigation light source with additional mirror and/or lens systems in order to produce a more uniform illumination pattern. Still another advantage of the present invention is that the transmittance function 56 of the optical system 10 may be tailored to compensate for any of a wide variety of non-uniform illumination patterns by simply changing the shape and/or position of the occluding element 54. The occluding element 54 is also easy and inexpensive to produce and, in one preferred embodiment, may comprise an opaque coating (e.g., paint) that may be deposited directly on the object side surface 52 of the lens 36.

Having briefly described the optical system 10 for compensating for the non-uniform illumination of an object, as well as some of its more significant features and advantages, the various embodiments of the optical system according to the present invention will now be described in detail. However, before proceeding with the detailed description, it should be noted that while the optical system 10 is shown and described herein as it could be used in conjunction with an optical navigation system 12 associated with a hand-held or portable scanner 14, it is not limited to use with any particular type of optical navigation system 12 or portable scanner device 14. Indeed, the optical system 10 could be used in any of a wide range of devices and applications where it is desirable to compensate for the non-uniform illumination of an object that is to be imaged. Consequently, the present invention should not be regarded as limited to the particular devices and applications shown and described herein.

With the foregoing considerations in mind, one preferred embodiment of the optical system 10 for compensating for the non-uniform illumination of an object is shown and described herein as it may be used in an optical navigation system 12 of the type that may be used in a portable or hand-held image scanner 14. The optical navigation system 12 produces a navigation signal (not shown) indicative of the position of the portable image scanner 14 with respect to an object 16, such as a document 18 with written text 20 provided thereon. The navigation system 12 thereby allows the scanner 14 to scan documents of nearly any size regardless of the size of the portable image scanner 14. For example, the entire document 18 may be scanned by moving the portable image scanner 14 over the document 18 along a meandering or curvilinear scanning path 22 which defines one or more scanning passes or "swipes." The position or navigation information provided by the navigation system 12 may then be used to piece or "stitch" together the various image data pieces acquired during each swipe to form image data representative of the entirety of the scanned object 16.

Figure 2:
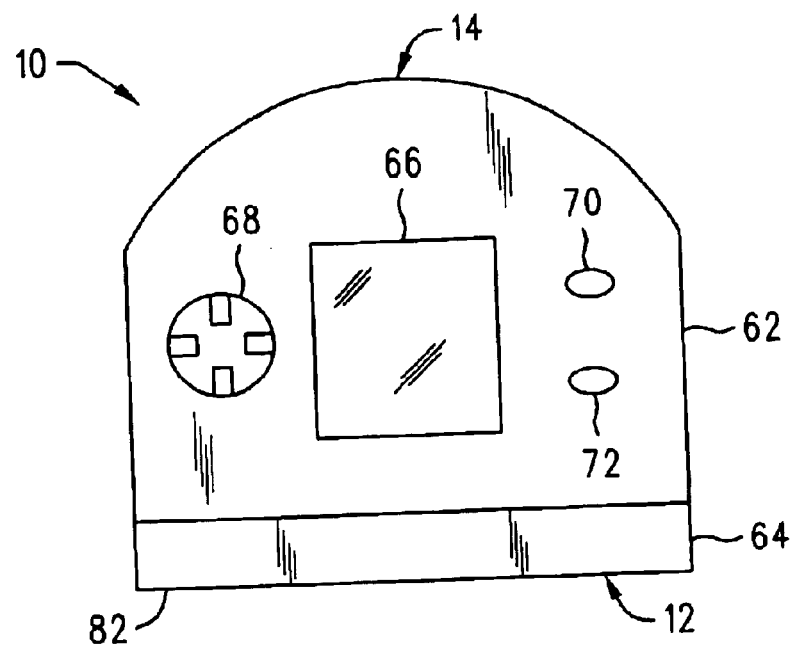
FIG. 2 is a front view in elevation of the portable image scanner shown in FIG. 1.

Referring now to FIGS. 2–4, the portable image scanner 14 may include a main body portion 62 and an image head portion 64. The main body portion 62 may comprise an overall configuration or shape conducive to hand manipulation by a user (not shown), although other configurations may be used. In one preferred embodiment, the main body portion 62 may be sized to receive the various electronic components (not shown) required for the operation of the portable image scanner 14. Alternatively, some or all of the various electronic components may be located elsewhere and may be connected to the main body portion 62 by a suitable link, such as a cable or infra-red data link (not shown). The main body portion 62 may also be provided with a display system 66 and various switching devices 68, 70, and 72 that may be required or desired for operation of the portable image scanner 14. While the switching devices 68, 70, and 72 are located on the front face of the main body portion 62 in one preferred embodiment, they may be located at any convenient position on the portable image scanner 14. The electrical power required to operate the portable image scanner 14 may be provided by a suitable electrical power source, such as a battery (not shown), that may also be contained within the main body portion 62 of portable image scanner 14. However, since the various electronic components, display devices, switching devices, and batteries that may be required or desired for use in a particular portable image scanner 14 are well-known in the art and since descriptions of the various components are not required to understand or practice the present invention, the various components, e.g., electronic components (not shown), display device 66, switching devices 68, 70, and 72, etc., utilized in one preferred embodiment of the present invention will not be described in further detail herein.

Referring now primarily to FIGS. 3 and 4, the image head portion 64 of portable scanner 14 may comprise a separate assembly that is attached to the main body portion 62. Alternatively, the image head portion 64 may comprise an integral part of the main body portion 62. In any event, the image head portion 64 of scanner 14 may be sized to receive an image sensing system 74 and the optical navigation system 12. Essentially, the image sensing system 74 produces an image signal (not shown) representative of a scan line (not shown) contained within an illuminated scan region 84 on the object 16 being scanned. The navigation system 12 produces a navigation data signal (also not shown) that is derived from navigation light 32 reflected by the illuminated navigation area 28.

The image sensing system 74 may comprise any of a wide variety of imaging systems now known in the art or that may be developed in the future that are suitable for producing image data relating to portions of the object 16 being scanned. Consequently, the present invention should not be regarded as limited to any particular type of image sensing system 74. However, by way of example, the image sensing system 74 utilized in one preferred embodiment of the invention may comprise an illumination system 76 for directing light 78 onto the object 16 being scanned. The light 78 passes through the elongate slot 80 provided on the contact face 82 of image head portion 64, as is best seen in FIG. 3. Accordingly, the light 78 produced by the illumination system 76 illuminates the scan region 84 on the object 16 that generally corresponds to the size and shape of the elongate slot 80. An imaging system 86 directs image light 88 reflected by the illuminated scan region 84 on the object 16 to a detector 90. The detector 90 produces an image signal (not shown) that is related to the image light 88.

The various components of the imaging sensing system 74 may comprise any of a wide range of components and devices that are well-known in the art or that may be developed in the future. For example, in one preferred embodiment, the illumination system 76 may comprise an array of light emitting diodes (LEDs) which produce light 78 of a brightness that is sufficient to illuminate the scan region 84 on the object 16 being scanned. Alternatively, other types of light sources, such as incandescent or fluorescent light sources, could also be used. It is preferred, but not required, that the imaging system 86 used to direct and focus the image light 88 onto the surface of the detector 90 comprise a contact image sensor, such as a contact image sensor of the type sold under the name SELFOC which is a registered trademark of the Nippon Sheet Glass Company, Limited. Alternatively, other types of imaging systems, such as projection imaging systems, could also be used. The detector 90 may comprise a linear CCD array having a resolution of 300 ppi (pixels per inch), such as type TS105, available from Texas Instruments, Inc. of Austin, Tex. Alternatively, other types of detectors having other resolutions could also be used.

The navigation system 12 is best seen in FIGS. 4 and 7 and may essentially comprise two subsystems, an optical subsystem 92 and a data processing subsystem (not shown). The optical subsystem 92 illuminates the navigation area 28 and projects an image of at least a portion of the illuminated navigation area 28 onto the surface of the navigation detector 34. The data processing subsystem (not shown) receives image data (not shown) from the navigation detector 34 and processes it to produce navigation data (also not shown). In the embodiment shown and described herein, the navigation data are derived from inherent structural features on the object 16 being scanned. As used herein, the term "inherent structural features" refers to those features of the object 16 being scanned that are characteristic of the object 16 and are independent of forming image data and/or systematic registration data on the object 16. For example, if the object 16 being scanned comprises a paper document 18, the inherent structural features of interest may be paper fibers. As another example, if the object comprises a glossy document or an overhead transparency film, then the inherent structural features of interest may comprise specular reflection fields produced by the illuminated navigation area 28.

As mentioned above, the navigation data produced by the navigation data processing subsystem (not shown) may be used by the image data processing system (also not shown) to stitch together the image data produced by the image sensing system 74 during the various scanning swipes. The navigation data processing subsystem and stitching algorithms may be of the type shown and described in U.S. Pat. No. 5,089,712 of Holland for "Sheet Advancement Control System Detecting Fiber Pattern of Sheet," and U.S. Pat. No. 5,578,813 of Allen et al., for "Freehand Image Scanning Device which Compensates for Non-Linear Movement," both of which have been specifically incorporated herein by reference for all that they disclose. However, since the navigation data processing subsystem and method for detecting and processing navigation data relating to the inherent structural features contained on the object 16 are described in great detail in U.S. Pat. Nos. 5,089,712 and 5,578,813, and since the details associated with the foregoing devices and processes are not required to understand or practice the present invention, the various components of the navigation data processing subsystem and the method for detecting and processing navigation data will not be described in further detail herein.

The optical subsystem portion 92 of the navigation system 12 may comprise first and second navigation sensors 24 and 26 which view or monitor corresponding first and second navigation areas (e.g., 28) on the object 16. Each navigation sensor 24, 26 utilizes the optical system 10 according to the present invention and is substantially identical to the other. Accordingly, only the first navigation sensor 24 will be described in detail.

Referring now primarily to FIGS. 4 and 5, the first navigation sensor 24 may comprise a light source 30 for illuminating the navigation area 28 via a navigation opening 94 provided in the contact face 82 of image head 64. The light source 30 may comprise any of a wide range of light sources that are readily commercially available. By way of example, in one preferred embodiment, the light source 30 may comprise an infra-red light emitting diode positioned so that light produced thereby is incident on the object 16 at a grazing angle which may be in the range of about 5 degrees to about 30 degrees. The grazing angle is the complement of the angle of incidence. Alternatively, the light could be incident at substantially normal angles if specular fields are to be detected. Similarly, the navigation detector 34 used to detect the navigation light 32 reflected by the illuminated navigation area 28 may comprise any of a wide range of detectors that are readily commercially available. By way of example, in one preferred embodiment, the navigation detector 34 may comprise a two dimensional CCD array having dimensions of about 48 by 48 pixels and having a resolution of about 600 ppi (pixels per inch). Alternatively, arrays having different sizes and/or resolutions could also be used.

Referring now to FIG. 5, the illumination provided to the navigation area 28 by the light source 30 in most instances will be generally non-uniform and may comprise a plurality of regions having varying brightness levels. Consider, for example, a hypothetical situation wherein the illuminated navigation area 28 contains two distinct regions having two distinct illumination levels—a brightly illuminated region 38 located in the center region of the illuminated navigation area 28, and a less brightly illuminated region 40 located in the outer regions of the illuminated navigation area 28. However, before proceeding, it should be noted that the foregoing configuration is illustrative only and that in practice the illuminated navigation area 28 normally will be characterized as having a large number of differently illuminated regions. However, for ease of discussion and illustration, the illuminated navigation area 28 is shown and described herein as having only two regions 38 and 40 of differing brightness and located at about the positions illustrated in FIG. 5.

The illumination provided to the navigation area 28 may be represented graphically by an illumination function 42 in which the position along the navigation area 28 is plotted along the abscissa (i.e., horizontal axis) and the illumination is plotted along the ordinate (i.e., the vertical axis). For convenience, the illumination function 42 shown in FIG. 6 is normalized so that maximum values of both the position within the illuminated navigation area 28 and the magnitude of the illumination are set to be unity. Thus, in the example situation shown and described herein, the central, brightly illuminated region 38 is defined to have a brightness value of unity, whereas the outer, less brightly illuminated region 40 has a brightness value that is about one half the brightness value of the central region 38. Again, it should be remembered that the foregoing number of differently illuminated regions (i.e., two) and the brightness ratios thereof (i.e., 2:1) are illustrative only and may or may not be representative of the actual number of differently illuminated regions and corresponding brightness ratios associated with a particular illumination system.

Referring now primarily to FIG. 7, with occasional reference to FIG. 4, the optical system 10 may comprise a lens assembly 36 positioned so that the lens 36 is located between the object 16 and the detector 34. It is generally preferred, but not required, that a transparent window 44 be positioned between the lens assembly 36 and the object 16 to shield the lens assembly 36 from dirt and protect it from damage. An aperture 46 may be positioned between the lens 36 and the detector 34 so that it is substantially co-planar with an image side focal plane 48 associated with lens assembly 36. The location of the aperture 46 at about the image side focal plane 48 of lens 36 makes the lens assembly 36 telecentric. As a result, the cones of light 32 reflected by various field points 50 contained within the illuminated navigation area 28 on the object 16 remain relatively distinct and well-separated in the region between the object 16 and the front or object side surface 52 of lens assembly 36. See FIG. 7.

The lens 36 may comprise any of a wide range of converging lenses (e.g., either a single lens or a multiple lens set), the selection of which would be obvious to persons having ordinary skill in the art after having become familiar with the teachings of the present invention. Consequently, the present invention should not be regarded as limited to any particular lens or multiple lens set. The lens 36 may also be coated or un-coated, again depending on the requirements of the particular application. By way of example, in one preferred embodiment, the lens 36 may comprise a single converging lens available from Philips Components of Eindhoven, NL and having a diameter of about 6.0 mm and a focal length of about 8.0 mm. Alternatively, lenses having other diameters and focal lengths could also be used.

The transparent window 44 may comprise a generally planar element made from any of a wide range of transparent materials (e.g., glasses or plastics) suitable for optical applications. By way of example, in one preferred embodiment, the transparent window 44 is made from cyclic olefin copolymer (COC).

The optical assembly 10 may also be provided with an occluding element 54 positioned between the object 16 and the lens 36 so that it blocks a predetermined amount of light from the brightly illuminated region 38, but does not substantially block light from the less brightly illuminated region 40. In one preferred embodiment, the occluding element 54 may comprise a substantially circular opaque material deposited on the object side surface 52 of lens 36, as best seen in FIG. 8. Alternatively, the occluding element 54 may be located on either the object side surface 96 or the lens side surface 98 of window 44. In still another alternative arrangement, the occluding element 54 may be placed anywhere between the object side surface 52 of lens 36 and the object 16 so long as the occluding element 54 is located at a substantially de-focused position so that the image thereof does not appear on the image focused on the detector 34.

The occluding element 54 may comprise any of a wide range of materials, such as metals or plastics, depending on where the occluding element 54 is to be located. For example, in one embodiment, the occluding element 54 may comprise an opaque metal or plastic material positioned so that it blocks a predetermined amount of light from the brightly illuminated region 38. In another embodiment, the occluding element 54 may comprise an opaque material (such as black paint or other such opaque or substantially opaque material) that may be deposited directly on the front side surface 52 of lens 36 or on either side 96, 98 of window 44, if such a window 44 is provided. In still another embodiment, the occluding element 54 need not be opaque, but could instead comprise a semi-transparent or translucent material that blocks some percentage of light incident thereon. In any event, the function of the occluding element is to block a predetermined amount of light from a predetermined location (i.e., a locus of field points 50) on the illuminated navigation area 28. The amount of light to be blocked by occluding element 54 as well as its position may be determined in accordance with the following considerations.

As was briefly described above, the combination of the telecentric lens assembly 36 and the occluding element 54 results in a transmittance function 56 for the optical system 10 that contains a low transmittance bucket 58 corresponding to field points 50 located in the center region of the illuminated navigation area 28. Therefore, if the optical system 10 is used to form an image of the illuminated navigation area 28 having an illumination function 42 substantially as shown in FIG. 6 (i.e., an illuminated area having a brightly illuminated center region 38 and a less brightly illuminated periphery 40), the result will be an image that appears as if it is more uniformly illuminated than is actually the case. Put in other words, the optical system 10 compensates for the non-uniform illumination of the object by having a high transmittance for areas that correspond to the less brightly illuminated region 40 (FIG. 5) and a reduced transmittance 58 for areas that correspond to the brightly illuminated region 38. Expressed graphically, the transmittance function 56 combines with the illumination function 42 to form a compensated illumination function 60 as best seen in FIG. 10.

The shape of the transmittance function 56 may be controlled by varying the size, shape, and location of the occluding element 54 so that the combination of the transmittance and illumination functions 56 and 42 results in a compensated illumination function 60 having the desired characteristic or response. For example, in the embodiment shown and described herein, it is desirable to adjust the transmittance function 56 so that the resulting compensated illumination function 60 forms a substantially straight line, as best seen in FIG. 10. Such a straight-line illumination function 60 means that the image formed by the optical system 10 will appear as if it were illuminated by a light source having a substantially uniform illumination pattern.

In many applications, the appropriate size, shape, and position of the occluding element 54 may be empirically determined with the aid of an optical simulation computer program, such as OSLO, available from Sinclair Optics. Given a known illumination function (e.g., illumination function 42 shown in FIG. 5), which may be determined from an actual light source and installation, the optical simulation computer program may then be used to determine the transmittance function resulting from the placement of an occluding element having a specific size and shape at a specific location. The transmittance function (e.g., 56) may then be tailored as necessary so that when it is combined with the particular illumination function (e.g., 42) it produces a compensated illumination function (e.g., 60) having the desired shape.

Figure 11:
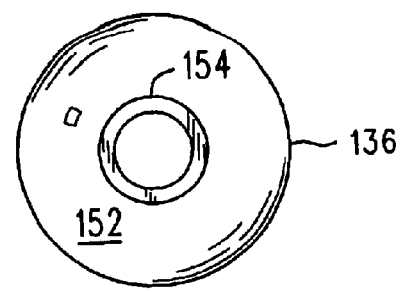
FIG. 11 is a plan view of a second embodiment of a lens having a ring-shaped occluding element.
Figure 12:
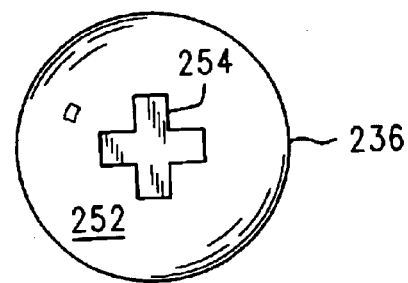
FIG. 12 is a plan view of a third embodiment of a lens having a cross-shaped occluding element.
Figure 13:
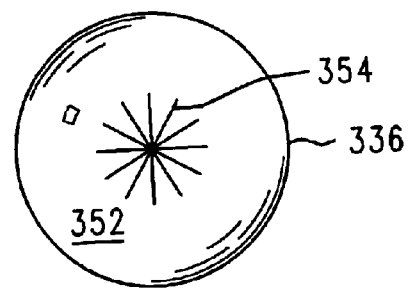
FIG. 13 is a plan view of a fourth embodiment of a lens having an occluding element that comprises a plurality of radially oriented lines.

For example, referring now to FIG. 11, it may turn out for a particular device that the occluding element should comprise a ring-shaped member 154 positioned so that it is essentially concentric with the center of the lens 136. Such an occluding element 154 would result in the optical system having an increased transmittance for field points that lie near the center of the illuminated navigation area. Such a configuration may be desirable if the illumination function contains a "dip" near the center of the illuminated navigation area. Still other configurations are possible. For example, the occluding element could take the shape of a cross 254, as best seen in FIG. 12, our could comprise a plurality of radially oriented lines 354, as shown in FIG. 13. Such alternative shapes will result in different transmittance functions (e.g., 56) for the optical system in which they are used, which may be required or desirable for a particular application.

As was the case for the first embodiment shown and described herein, any of the various configurations of the occluding element (e.g., the ring shaped element 154, the cross shaped element 254, or radially arranged lines 354) may be positioned or deposited on the object side surface 152, 252, or 352 of the respective lens assembly 136, 236, or 336. Alternatively, the various occluding elements may be positioned or deposited on either the object side (e.g., 96) or the lens side (e.g., 98) of a transparent window (e.g., 44) if the optical system is so provided. In still another arrangement, the various occluding elements (e.g., 154, 254, or 354) could comprise a separate element positioned at any convenient, but substantially de-focused, location between the object and the lens.

It is contemplated that the inventive concepts herein described may be variously otherwise embodied and it is intended that the appended claims be construed to include alternative embodiments of the invention except insofar as limited by the prior art.

What is claimed is:

1. An optical system for forming an image of at least a portion of an illuminated area on an object, the illuminated area being characterized by at least one brightly illuminated region and at least one less brightly illuminated region, comprising:

a lens positioned a spaced distance from the illuminated area on the object, said lens having an image side focal plane;

an aperture stop positioned so that it is substantially co-planar with the image side focal plane of said lens; and an occluding element positioned between said lens and the illuminated area on the object so that said occluding element blocks a predetermined amount of light from the brightly illuminated region but does not substantially block light from the less brightly illuminated region.

2. The optical system of claim 1, wherein said lens includes an object side surface and wherein said occluding element is positioned adjacent the object side surface of said lens.

3. The optical system of claim 2, wherein said occluding element comprises an opaque material deposited on the object side surface of said lens.

4. The optical system of claim 1, further comprising a window positioned between the object side surface of said lens and the illuminated area on the object, said window having an object side surface and a lens side surface.

5. The optical system of claim 4, wherein said occluding element is positioned adjacent the lens side surface of said window.

6. The optical system of claim 5, wherein said occluding element comprises an opaque material deposited on the lens side surface of said window.

7. The optical system of claim 1, wherein said occluding element comprises a substantially circular shape.

8. An optical system for forming an image of at least a portion of an illuminated area on an object, the illuminated area being characterized by at least one brightly illuminated region and at least one less brightly illuminated region, comprising:

lens means positioned a spaced distance from the object for forming an image of at least a portion of the illuminated area on the object;

telecentric aperture stop means operatively associated with said lens means for blocking selected light rays refracted by said lens means; and occluding means positioned between said lens means and the object for blocking a predetermined amount of light from the brightly illuminated region but not substantially blocking light from the less brightly illuminated region.

9. A method of forming an image of at least a portion of an illuminated area on an object, the illuminated area being characterized by at least one brightly illuminated region and at least one less brightly illuminated region, comprising:

positioning a lens a spaced distance from the illuminated area on the object, said lens having an image side focal plane;

positioning an aperture stop at about the image side focal plane of said lens; and blocking a predetermined amount of light from the brightly illuminated region before the light from the brightly illuminated region is refracted by said lens.

10. A navigation system for an image sensing device, said navigation system producing a navigation signal related to navigation light received from an illuminated navigation area on an object, the illuminated navigation area being characterized by at least one brightly illuminated region and at least one less brightly illuminated region, comprising:

a detector;

a lens having an image side focal plane, said lens being positioned between said detector and the illuminated navigation area on the object so that said lens forms on said detector an image of at least a portion of the illuminated navigation area;

an aperture stop positioned so that it is substantially co-planar with the image side focal plane of said lens; and an occluding element positioned between said lens and the illuminated area on the object so that said occluding element blocks a predetermined amount of navigation light from the brightly illuminated region but does not substantially block navigation light from the less brightly illuminated region.

11. The navigation system of claim 10, wherein said lens includes an object side surface and wherein said occluding element is positioned adjacent the object side surface of said lens.

12. The navigation system of claim 11, wherein said occluding element comprises an opaque material deposited on the object side surface of said lens.

13. The navigation system of claim 10, further comprising a window positioned between the object side surface of said lens and the illuminated area on the object, said window having an object side surface and a lens side surface.

14. The navigation system of claim 13, wherein said occluding element is positioned adjacent the lens side surface of said window.

15. The navigation system of claim 14, wherein said occluding element comprises an opaque material deposited on the lens side surface of said window.

16. The navigation system of claim 10, wherein said occluding element comprises a substantially circular shape.

17. A navigation system for producing a navigation signal related to navigation light received from an illuminated navigation area on an object, the illuminated navigation area being characterized by at least one brightly illuminated region and at least one less brightly illuminated region, comprising:

detector means for producing an output signal related to light incident thereon;

lens means positioned between said detector means and the object for forming on said detector an image of at least a portion of the illuminated navigation area;

telecentric aperture stop means operatively associated with said lens means for blocking selected navigation light rays refracted by said lens means; and occluding means positioned between said lens means and the object for blocking a predetermined amount of navigation light from the brightly illuminated region but not substantially blocking navigation light from the less brightly illuminated region.

* * * * *